(12) United States Patent
Yoshizaki

(10) Patent No.: US 8,481,940 B2
(45) Date of Patent: Jul. 9, 2013

(54) DETECTION DEVICE, SENSOR DEVICE, AND ELECTRONIC APPARATUS

(75) Inventor: Kei Yoshizaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 50 days.

(21) Appl. No.: 13/316,648

(22) Filed: Dec. 12, 2011

(65) Prior Publication Data

US 2012/0161002 A1 Jun. 28, 2012

(30) Foreign Application Priority Data

Dec. 24, 2010 (JP) ................................. 2010-287183

(51) Int. Cl.
*G01J 5/00* (2006.01)
(52) U.S. Cl.
USPC ..................................................... 250/338.3
(58) Field of Classification Search
USPC ............... 250/338.1–338.5, 339.01–339.15, 250/340, 341.1–341.8
See application file for complete search history.

(56) References Cited

U.S. PATENT DOCUMENTS

| | | | | |
|---|---|---|---|---|
| 4,024,560 A * | 5/1977 | Miller et al. | ................... | 257/252 |
| 4,147,562 A * | 4/1979 | Chiang et al. | ................ | 136/213 |
| 4,250,384 A * | 2/1981 | Pulvari | ........................ | 250/330 |
| 4,336,452 A * | 6/1982 | Baker | ........................ | 250/338.3 |
| 4,404,468 A * | 9/1983 | Kleinschmidt | .............. | 250/342 |
| 4,697,081 A * | 9/1987 | Baker | ........................ | 250/338.3 |
| 7,564,021 B2 * | 7/2009 | Mantese et al. | ........... | 250/214 R |

FOREIGN PATENT DOCUMENTS

| | | | |
|---|---|---|---|
| JP | 59-142427 A | | 8/1984 |
| JP | 61-045937 A | | 3/1986 |

* cited by examiner

*Primary Examiner* — Kiho Kim
(74) *Attorney, Agent, or Firm* — Global IP Counselors, LLP

(57) ABSTRACT

A detection device includes a plurality of pyroelectric elements, detection circuit and a poling circuit. The pyroelectric elements include a first pyroelectric element through an n-th pyroelectric element serially provided between a detection node and a first power supply node with n being an integer equal to or greater than 2. The detection circuit is connected to the detection node. The poling circuit is configured to perform a poling process, in which a direction of polarization of at least one of the first pyroelectric element through the nth pyroelectric element is set independently of a direction of polarization of another one of the first pyroelectric element through the n-th pyroelectric element.

20 Claims, 12 Drawing Sheets

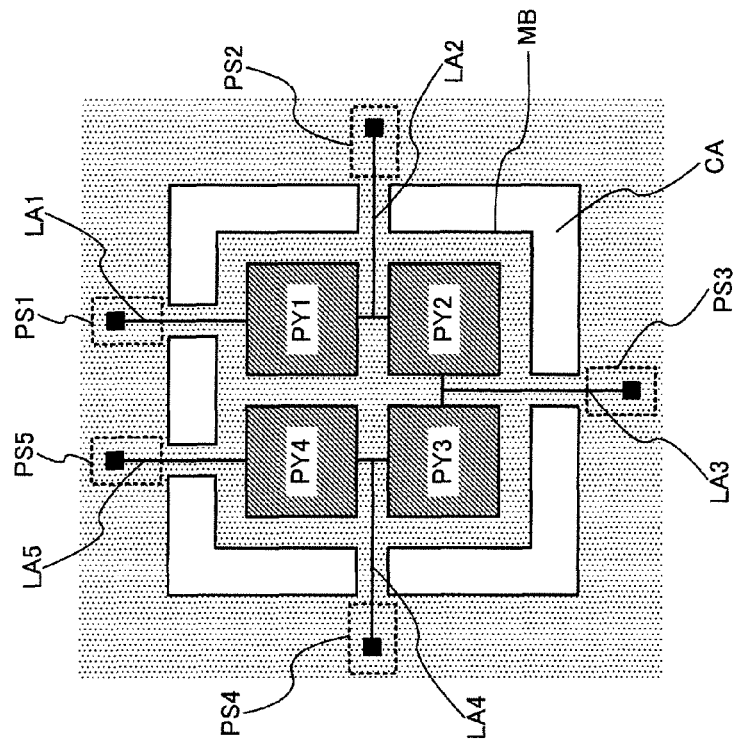
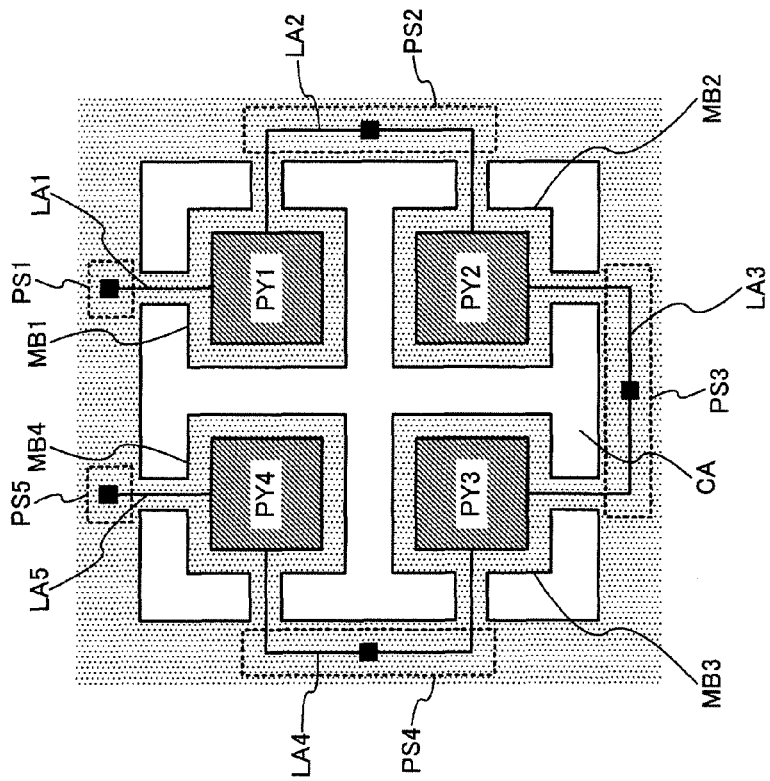
Fig. 7A
Fig. 7B

000# DETECTION DEVICE, SENSOR DEVICE, AND ELECTRONIC APPARATUS

CROSS-REFERENCE TO RELATED APPLICATIONS

This application claims priority to Japanese Patent Application No. 2010-287183 filed on Dec. 24, 2010. The entire disclosure of Japanese Patent Application No. 2010-287183 is hereby incorporated herein by reference.

BACKGROUND

1. Technical Field

The present invention relates to detection device, a sensor device, and an electronic apparatus or the like.

2. Related Art

A conventional infrared detection device is known which uses a pyroelectric element. A human body, for example, radiates infrared rays having a wavelength in the vicinity of 10 μm, and by detecting the infrared rays, the presence or temperature information of a human body can be detected without contact. Consequently, such an infrared detection circuit can be used to detect an intruder or measure a physical quantity.

The technique disclosed in Japanese Laid-Open Patent Publication No. 59-142427, for example, is known as a conventional technique for an infrared detection device. In the conventional technique of Japanese Laid-Open Patent Publication No. 59-142427, a chopper is used to vary the temperature of a pyroelectric element to generate a pyroelectric current while switching between irradiation and blocking of infrared rays to the pyroelectric element, and this pyroelectric current is charged into the pyroelectric element as such and thereby detected as a voltage signal.

However, since the relative permittivity of the ferroelectric body used in the pyroelectric element is extremely high in this conventional technique, the electrical capacitance of the pyroelectric element is necessarily large, and a large voltage signal cannot be retrieved. As a result, it is difficult to increase the sensitivity of the detection device.

SUMMARY

Through the several aspects of the present invention, a detection device, sensor device, and electronic apparatus or the like can be provided whereby the polarization directions of pyroelectric elements can be individually set to increase detection sensitivity.

A detection device according to one aspect of the present invention includes a plurality of pyroelectric elements, a detection circuit, and a poling circuit. The pyroelectric elements include a first pyroelectric element through an n-th pyroelectric element serially provided between a detection node and a first power supply node with n being an integer equal to or greater than 2. The detection circuit is connected to the detection node. The poling circuit is configured to perform a poling process, in which a direction of polarization of at least one of the first pyroelectric element through the n-th pyroelectric element is set independently of a direction of polarization of another one of the first pyroelectric element through the n-th pyroelectric element.

Through this aspect of the present invention, the polarization directions of n pyroelectric elements can be individually set by the poling circuit. As a result, poling processing can be performed and the polarization directions of n pyroelectric elements can each be set to the desired direction at the time of factory shipment or before the start of use, for example. As a result, it is possible to obtain such effects as increased sensitivity and enhanced detection precision in the detection device.

In another aspect of the present invention, the poling circuit is preferably perform a poling processing in which a direction of polarization of at least two of the pyroelectric elements among the first pyroelectric element through n-th pyroelectric element is set to the same direction.

Through this configuration, by setting the polarization directions of at least two pyroelectric elements among the n pyroelectric elements to the same direction, an output signal can be obtained that is larger than the output signal obtained from a single pyroelectric element. For example, by setting the polarization directions of n pyroelectric elements to the same direction, an output signal can be obtained that is n times the output signal obtained from a single pyroelectric element. As a result, the sensitivity of the detection device can be increased and the detection precision thereof enhanced without modifying the material or film thickness of the pyroelectric element, for example.

In another aspect of the present invention, the poling circuit is preferably configured to set the direction of polarization of at least two of the first pyroelectric element through the n-th pyroelectric element to a first polarization direction, and to set the direction of polarization of the pyroelectric elements other than the at least two of the first pyroelectric element through the n-th pyroelectric element to a second polarization direction which is the opposite direction from the first polarization direction.

Through this configuration, in the case of a disturbance or a change in the environmental temperature, an oppositely directed pyroelectric current occurs from the pyroelectric elements set to the second polarization direction, and the effect of the disturbance or change in environmental temperature can thereby be reduced. As a result, infrared detection and other functions can be performed stably and with higher precision without being affected by disturbances or environmental temperature.

In another aspect of the present invention, when the direction of polarization of an i-th pyroelectric element through a j-th pyroelectric element among the first pyroelectric element through the n-th pyroelectric element is set to a first polarization direction, the poling circuit is preferably configured to apply a poling voltage to an i-th connection node disposed at one end of the i-th pyroelectric element, and to set a (j+1)-th connection node disposed at the other end of the j-th pyroelectric element to a first power supply voltage.

Through this configuration, since a voltage for setting the polarization direction is applied to each of the i-th pyroelectric element through j-th pyroelectric element, the polarization directions of the i-th pyroelectric element through j-th pyroelectric element can be set to the first polarization direction.

In another aspect of the present invention, the poling circuit preferably includes a first switch circuit configured to apply the poling voltage to the i-th connection node, and a second switch circuit configured to set the (j+1)-th connection node to the first power supply voltage.

Through this configuration, the polarization direction of one or a plurality of pyroelectric elements provided between the i-th connection node selected by the first switch circuit and the (j+1)-th connection node selected by the second switch circuit can be set to the first polarization direction.

In another aspect of the present invention, when the direction of polarization of a p-th pyroelectric element through a q-th pyroelectric element among the first pyroelectric element through the n-th pyroelectric element is set to a second polarization direction which is the opposite direction from the first polarization direction, the poling circuit is preferably configured to set a p-th connection node disposed at one end of the p-th pyroelectric element to the first power supply voltage, and to apply the poling voltage to a (q+1)-th connection node disposed at the other end of the q-th pyroelectric element.

Through this configuration, since a voltage for setting the polarization direction to the second polarization direction is applied to each of the p-th pyroelectric element through q-th pyroelectric element, the polarization directions of the p-th pyroelectric element through q-th pyroelectric element can be set to the second polarization direction.

In another aspect of the present invention, the poling circuit preferably includes a first switch circuit configured to apply the poling voltage to the (q+1)-th connection node, and a second switch circuit configured to set the p-th connection node to the first power supply voltage.

Through this configuration, the polarization direction of one or a plurality of pyroelectric elements provided between the (q+1)-th connection node selected by the first switch circuit and the p-th connection node selected by the second switch circuit can be set to the second polarization direction.

In another aspect of the present invention, the poling circuit preferably includes a detection switch element disposed between the detection node and a first connection node disposed at one end of the first pyroelectric element, and the poling circuit is preferably configured to set the detection switch element to an ON state during a detection period, and to set the detection switch element to an OFF state during a period of the poling processing.

Through this configuration, in a state in which the poling voltage is not applied to the n-th pyroelectric element, the voltage signal from the pyroelectric element can be inputted to the detection circuit during the detection period. During the period of poling processing, poling processing of the pyroelectric element can be performed in a state in which the poling voltage is not inputted to the detection circuit.

In another aspect of the present invention, the poling circuit preferably includes a poling monitor circuit configured to monitor whether or not the poling process has been performed in a normal manner.

Through this configuration, since poling processing can be performed again in the case that poling processing was not performed normally, highly reliable infrared detection or the like is possible.

In another aspect of the present invention, the poling monitor circuit is preferably configured to connect a connection node disposed at one end of each of the first pyroelectric element through the n-th pyroelectric element to the detection node, and to monitor the direction of polarization of each of the first pyroelectric element through the n-th pyroelectric element based on a detection result of the detection circuit.

Through this configuration, since the poling monitor circuit can individually monitor the polarization of each pyroelectric element, poling processing can be reliably performed for each pyroelectric element. As a result, highly reliable infrared detection or the like is possible.

In another aspect of the present invention, the detection device preferably further includes a shared support member supporting the first pyroelectric element through the n-th pyroelectric element, with the first pyroelectric element through the n-th pyroelectric element being formed on the shared support member.

Through this configuration, since n pyroelectric elements can be provided on the shared support member, the surface area of a single sensor can be reduced. As a result, sensor cells can be arranged at high density in a sensor array in which a plurality of sensor cells is arranged in an array.

In another aspect of the present invention, the detection device preferably further includes a shared cavity region provided below the shared support member.

Through this configuration, n pyroelectric elements and the shared support member can be thermally separated from a substrate. As a result, it is possible to obtain such effects as increased sensitivity of infrared detection.

In another aspect of the present invention, the detection device preferably further includes a first support member through n-th support member supporting the first pyroelectric element through the n-th pyroelectric element, respectively, with the first pyroelectric element through the n-th pyroelectric element are respectively formed on the corresponding first support member through the n-th support member.

Through this configuration, since the surface area of each of the n support members can be reduced, the heat capacity of the pyroelectric elements can be reduced. As a result, it is possible to obtain such effects as increased sensitivity of infrared detection.

In another aspect of the present invention, the detection device preferably further includes a plurality of junctions connecting each of the first support member through the n-th support member, and the poling circuit is preferably configured to feed a poling voltage to the first pyroelectric element through the n-th pyroelectric element via wiring provided to the junctions.

Through this configuration, since the poling circuit can apply the poling voltage to the pyroelectric elements via the wiring provided to the junctions, the polarization direction of each pyroelectric element can be individually set.

In another aspect of the present invention, the detection device preferably further includes a shared cavity region which is common to the first support member through the n-th support member, with the shared cavity region is provided below the first support member through the n-th support member.

Through this configuration, n pyroelectric elements and n shared support members can be thermally separated from a substrate. As a result, it is possible to obtain such effects as increased sensitivity of infrared detection.

In another aspect of the present invention, the detection device preferably further includes a first cavity region through an n-th cavity region which correspond to the first support member through the n-th support member, with the first cavity region through the n-th cavity region being respectively provided below the corresponding first support member through the n-th support member.

Through this configuration, the pyroelectric elements and the support members can be thermally separated from a substrate. As a result, it is possible to obtain such effects as increased sensitivity of infrared detection.

Another aspect of the present invention relates to a sensor device comprising the detection device according to any of the aspects described above.

A sensor device according to another aspect of the present invention includes a sensor array, one or more row lines, one or more column lines, a row selection circuit connected to the one more row lines, and a read circuit connected to the one more column lines. The sensor array has a plurality of sensor cells with each of the sensor cells including a plurality of pyroelectric elements, a detection circuit, and a poling circuit. The pyroelectric elements include a first pyroelectric element through an n-th pyroelectric element serially provided between a detection node and a first power supply node with n being an integer equal to or greater than 2. The detection circuit is connected to the detection node. The poling circuit is configured to perform a poling process, in which a direction of polarization of at least one of the first pyroelectric element through the n-th pyroelectric element is set independently of a direction of polarization of another one of the first pyroelectric element through the n-th pyroelectric element.

Through this other aspect of the present invention, since the polarization directions of n pyroelectric elements of the sensor cell can be individually set, by setting the polarization directions of n pyroelectric element to the same direction, for example, the detection sensitivity of the sensor device can be increased. By setting the polarization direction of at least one pyroelectric element among the n pyroelectric elements to the opposite direction from the polarization direction of another pyroelectric element, the effect of a disturbance or the environmental temperature can be reduced. As a result, an infrared camera, for example, or the like having high sensitivity and precision can be obtained.

An electronic apparatus according to another aspect of the present invention includes the sensor device according to any of the aspects described above.

BRIEF DESCRIPTION OF THE DRAWINGS

Referring now to the attached drawings which form a part of this original disclosure:

FIGS. 7A and 7B are views showing second and third examples, respectively, of the configuration for the pyroelectric elements;

DETAILED DESCRIPTION OF EXEMPLARY EMBODIMENTS

Figure 1:
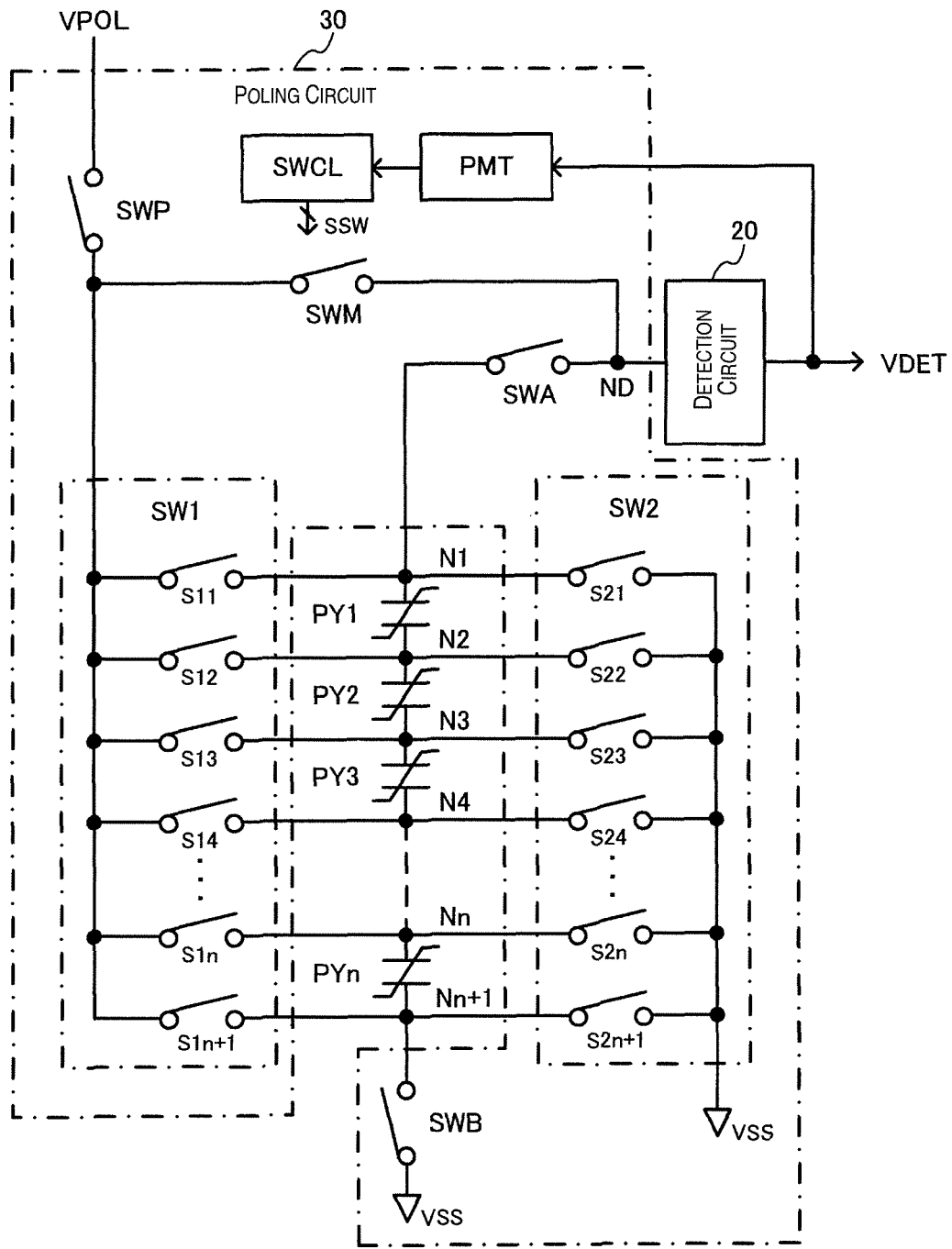
FIG. 1 is a basic example of the configuration of a detection device.

Preferred embodiments of the present invention will be described in detail. The embodiments described below do not unduly limit the scope of the present invention as recited in the claims, and it will be apparent to those skilled in the art that all of the configurations described in the embodiments are not necessarily essential means of achievement of the present invention.

1. Pyroelectric Element

In the detection device of the present embodiment, a pyroelectric element (thermal sensor element, infrared detection element, thermo-optical detection element, ferroelectric element) is used as an element for detecting infrared rays or the like. The pyroelectric element is an element which uses a lead zirconate titanate (PZT), for example, or other ferroelectric body, and utilizes a pyroelectric current generated by a change in temperature of the pyroelectric element to detect infrared rays.

Specifically, infrared rays radiated to the pyroelectric element are periodically interrupted by a chopper or the like to vary the temperature of the pyroelectric element and generate a pyroelectric current, and the pyroelectric current is charged into the pyroelectric element as such and thereby detected as a voltage signal. The larger this voltage signal is, the higher the sensitivity of the detection device can be, and the higher the detection precision that can be obtained. Conditions for increasing the detected voltage signal are described below.

The detected voltage signal $\Delta V$ is given by the equation below, where Q is the total electric charge charged into the pyroelectric element by the pyroelectric current, and C is the electrical capacitance of the pyroelectric element.

$$\Delta V = Q/C \qquad (1)$$

The total electric charge Q is given by the following equation, where $\Delta T$ is the temperature change of the pyroelectric element, p is the pyroelectric coefficient, and S is the surface area of the pyroelectric element.

$$Q = p \times S \times \Delta T \qquad (2)$$

The electrical capacitance C of the pyroelectric element is given by the following equation, where $\epsilon$ is the relative permittivity of the ferroelectric body (pyroelectric body), $\epsilon 0$ is the permittivity in vacuum, and d is the thickness of the ferroelectric body.

$$C = \epsilon \times \epsilon 0 \times S/d \qquad (3)$$

Based on Equations (1) through (3), the voltage signal $\Delta V$ is as shown below.

$$\Delta V = p \times \Delta T \times d/(\epsilon \times \epsilon 0) \qquad (4)$$

As is apparent from Equation (4), in order to increase the voltage signal $\Delta V$, the pyroelectric coefficient p, the temperature change $\Delta T$, and the thickness d of the ferroelectric body must be increased, and the relative permittivity $\epsilon$ of the ferroelectric body must be decreased.

The pyroelectric coefficient p corresponds to the change in spontaneous polarization of the pyroelectric body with respect to the temperature change, and the size of the pyroelectric coefficient p depends upon the material and is substantially constant at temperatures lower than the Curie point. In the case of lead zirconate titanate (PZT), for example, the pyroelectric coefficient p is 50 nC/K/cm$^2$, which is excellent.

The temperature change $\Delta T$ is the temperature difference of the pyroelectric element before and after infrared reception. In order to increase the temperature change $\Delta T$, the heat capacity of the sensor as a whole that includes the pyroelectric element must be low to facilitate an increase in temperature of the pyroelectric element, and heat transfer between the sensor and the surrounding area must be suppressed. For example, a PZT thin film (about 100 nm) is formed to reduce the heat capacity, and a structure is used in which a sensor including a pyroelectric element is thermally separated by a MEMS technique.

As is apparent from Equation (4), a large thickness d for the ferroelectric body is preferred in order to increase the voltage signal ΔV. However, when the thickness d is increased, problems arise in that the heat capacity of the sensor as a whole that includes the pyroelectric element increases.

The relative permittivity ϵ of the ferroelectric body is determined by the material, but in the case of PZT, for example, the relative permittivity of about 1000 leads to a large electrical capacitance C.

Thus, when the thickness d is reduced in an effort to reduce the heat capacity and increase the temperature change ΔT, the electrical capacitance C increases. A large electrical capacitance C results in the inability to increase the voltage signal ΔV. Conversely, when the thickness d is increased in order to decrease the electrical capacitance C, the heat capacity increases and the temperature change ΔT decreases. As a result, the voltage signal ΔV cannot be increased.

In the case of PZT, for example, the relative permittivity ϵ can be reduced by such methods as changing the composition ratios of materials and optimizing the film formation process, but a marked reduction in relative permittivity is difficult to achieve. Polyvinylidene fluoride (PVDF) and other organic ferroelectrics can be cited as ferroelectric materials other than PZT which have low relative permittivity, but because of problems with reliability of these materials, and since the pyroelectric coefficients thereof are one or more orders of magnitude lower than that of PZT, adequate performance cannot be anticipated.

2. Detection Device

FIG. 1 shows an example of the basic configuration of the detection device of the present embodiment. The detection device of the present embodiment includes first through n-th (where n is an integer equal to 2 or greater) pyroelectric elements PY1 through PYn, a detection circuit 20, and a poling circuit 30. The detection device of the present embodiment is not limited to the configuration shown in FIG. 1, and it will be apparent to those skilled in the art that various modifications thereof are possible, such as omitting some elements, replacing some elements with other elements, or adding other elements.

The first through n-th pyroelectric elements PY1 through PYn are provided in series between a detection node ND and a first power supply node VSS (low-potential-side power supply node) that supplies the first power supply voltage. The polarization directions of the first through n-th pyroelectric elements PY1 through PYn are individually set by the poling circuit 30.

For the polarization directions to be individually set means that rather than the polarization directions of n pyroelectric elements being set at once, the polarization directions of at least one pyroelectric element are separately set. In a case in which there are four pyroelectric elements, for example, the polarization direction may be set for one pyroelectric element at a time or two pyroelectric elements at a time, or once the polarization direction of one pyroelectric element is set, the polarization directions of the following three pyroelectric elements may be set.

A node at one end of an i-th (where i is an integer such that $1 \leq i \leq n$) pyroelectric element PYi among the first through n-th pyroelectric elements PY1 through PYn is designated as an i-th connection node Ni, and a node at the other end of the i-th pyroelectric element PYi is designated as an (i+1)-th connection node Ni+1. For example, as shown in FIG. 1, a node at one end of a third pyroelectric element PY3 is a third connection node N3, and a node at the other end is a fourth connection node N4.

The detection circuit 20 is connected to the detection node ND, and detects a voltage signal which is based on a pyroelectric current of the first through n-th pyroelectric elements PY1 through PYn, and outputs a detection signal VDET. The specific configuration of the detection circuit 20 is described hereinafter.

The poling circuit 30 performs poling processing for individually setting the polarization directions of the first through n-th pyroelectric elements PY1 through PYn. Specifically, the poling circuit 30 can perform poling processing for setting the polarization directions of at least two pyroelectric elements among the first through n-th pyroelectric elements PY1 through PYn to the same direction. The polarization directions of the other pyroelectric elements can be set to different directions.

More specifically, the poling circuit 30 sets the polarization directions of at least two pyroelectric elements among the first through n-th pyroelectric elements PY1 through PYn to a first polarization direction. The polarization directions of the pyroelectric elements other than the at least two pyroelectric elements whose polarization directions were set to the first polarization direction is set to a second polarization direction which is the opposite direction from the first polarization direction.

In the case that the electrode on the detection node ND side of each pyroelectric element is designated as the upper electrode, and the electrode on the first power supply node VSS side is designated as the lower electrode, the first polarization direction is the polarization direction in which a negative (−) polarization charge occurs on the upper electrode side and a positive (+) polarization charge occurs on the lower electrode side. The second polarization direction is the polarization direction in which a positive (+) polarization charge occurs on the upper electrode side and a negative (−) polarization charge occurs on the lower electrode side.

The poling circuit 30 includes first and second switch circuits SW1, SW2. The first switch circuit SW1 selects any one connection node among first through (n+1)-th connection nodes N1 through Nn+1 and applies a poling voltage VPOL to the selected connection node. The second switch circuit SW2 selects any one connection node among the first through (n+1)-th connection nodes N1 through Nn+1 and sets the selected connection node to a first power supply node VSS. The polarization directions of the first through n-th pyroelectric elements PY1 through PYn can thereby be individually set.

In other words, in a case in which the polarization directions of i-th through j-th pyroelectric elements PYi through PYj among the first through n-th pyroelectric elements PY1 through PYn are set to the first polarization direction, the poling circuit 30 applies the poling voltage VPOL to an i-th connection node Ni which is a node at one end of the i-th pyroelectric element PYi, and sets a (j+1)-th connection node Nj+1 which is a node at the other end of the j-th pyroelectric element PYj to the first power supply voltage supplied by the first power supply node VSS.

In this case, the first switch circuit SW1 applies the poling voltage VPOL to the i-th connection node Ni, and the second switch circuit SW2 sets the (j+1)-th connection node Nj+1 to the first power supply node VSS.

The number j−i+1 of i-th through j-th pyroelectric elements PYi through PYj is less than n. For example, in a case in which there are four pyroelectric elements (n=4), the i-th through j-th pyroelectric elements PYi through PYj are one, two, or three pyroelectric elements, and not four pyroelectric elements.

On the other hand, in a case in which the polarization directions of p-th through q-th pyroelectric elements PYp through PYq among the first through n-th pyroelectric elements PY1 through PYn are set to a second polarization direction which is the opposite direction from the first polarization direction, the poling circuit 30 sets a p-th connection node Np which is a node at one end of the p-th pyroelectric element PYp to the first power supply voltage supplied by the first power supply node VSS, and applies the poling voltage VPOL to a (q+1)-th connection node Nq+1 which is a node at the other end of the q-th pyroelectric element PYq.

In this case, the first switch circuit SW1 applies the poling voltage VPOL to the (q+1)-th connection node Nq+1, and the second switch circuit SW2 sets the p-th connection node Np to the first power supply voltage supplied by the first power supply node VSS.

The number q−p+1 of p-th through q-th pyroelectric elements PYp through PYq is less than n. For example, in a case in which there are four pyroelectric elements (n=4), the p-th through q-th pyroelectric elements PYp through PYq are one, two, or three pyroelectric elements, and not four pyroelectric elements.

The poling processing performed by the poling circuit 30 will be described in detail hereinafter.

The first switch circuit SW1 includes first through (n+1)-th switch elements S11 through S1$n$+1, and by the setting of any one of the first through (n+1)-th switch elements S11 through S1$n$+1 to the ON state, the poling voltage VPOL is applied to a single connection node selected from among the first through (n+1)-th connection nodes N1 through Nn+1.

The second switch circuit SW2 includes first through (n+1)-th switch elements S21 through S2$n$+1, and by the setting of any one of the first through (n+1)-th switch elements S21 through S2$n$+1, a single connection node selected from among the first through (n+1)-th connection nodes N1 through Nn+1 is set to the first power supply voltage supplied by the first power supply node VSS.

The poling circuit 30 further includes a detection switch element SWA, a first power supply switch element SWB, a poling switch element SWP, and a poling monitor switch element SWM. The poling circuit 30 further includes a switch control circuit SWCL. The switch control circuit SWCL outputs a switch control signal SSW for controlling the on/off states of the switch elements of the first and second switch circuits SW1, SW2 as well as the other switch elements SWA, SWB, SWP, SWM. Wiring for feeding the switch control signal SSW to the switch elements is not shown in the drawing.

The detection switch element SWA is provided between the detection node ND and a first connection node N1 which is a node at one end of the first pyroelectric element PY1. The first power supply switch element SWB is provided between the first power supply node VSS and the (n+1)-th connection node Nn+1. The poling switch element SWP is provided between the first switch circuit SW1 and a poling voltage feed node that feeds the poling voltage VPOL. The poling monitor switch element SWM is provided between the first switch circuit SW1 and the detection node ND.

During a detection period which is the period in which infrared rays are detected, the poling circuit 30 sets the detection switch element SWA and the first power supply switch element SWB to the ON state and sets the switch elements of the first and second switch circuits SW1, SW2, as well as the poling switch element SWP and the poling monitor switch element SWM, to the OFF state. During the detection period, voltage signals based on the pyroelectric currents of the first through n-th pyroelectric elements PY1 through PYn are thereby inputted to the detection circuit 20 via the detection switch element SWA.

During the period of poling processing, the poling circuit 30 sets the detection switch element SWA, the first power supply switch element SWB, and the poling monitor switch element SWM to the OFF state and sets the poling switch element SWP to the ON state. The poling circuit 30 also sets any one switch element of the first switch circuit SW1 to the ON state and sets any one switch element of the second switch circuit SW2 to the ON state. The poling voltage VPOL is thereby applied to at least one switching element of the first through n-th pyroelectric elements PY1 through PYn. Poling processing may be performed for each pyroelectric element one at a time, or may be performed simultaneously for a plurality of pyroelectric elements connected in series.

This poling processing may be performed at the time of factory shipment or before the start of use by a user, for example.

The poling circuit 30 may include a poling monitor circuit PMT. The poling monitor circuit PMT monitors whether poling processing is performed normally. Specifically, during a poling monitor period, the poling circuit 30 connects a connection node at one end of each pyroelectric element of the first through n-th pyroelectric elements PY1 through PYn to the detection node ND, and connects a connection node at the other end to the first power supply node VSS. Furthermore, the poling circuit 30 sets the poling monitor switch element SWM to the ON state and sets the other switch elements SWA, SWB, SWP to the OPP state. Based on the detection results of the detection circuit 20, the poling monitor circuit PMT monitors whether the poling processing of each pyroelectric element was performed normally. In other words, whether the poling processing was performed normally is monitored by determining whether the detection signal VDET from the detection circuit 20 is equal to a predetermined voltage. In the case that poling processing was not performed normally, poling processing can be performed again.

Figure 2:
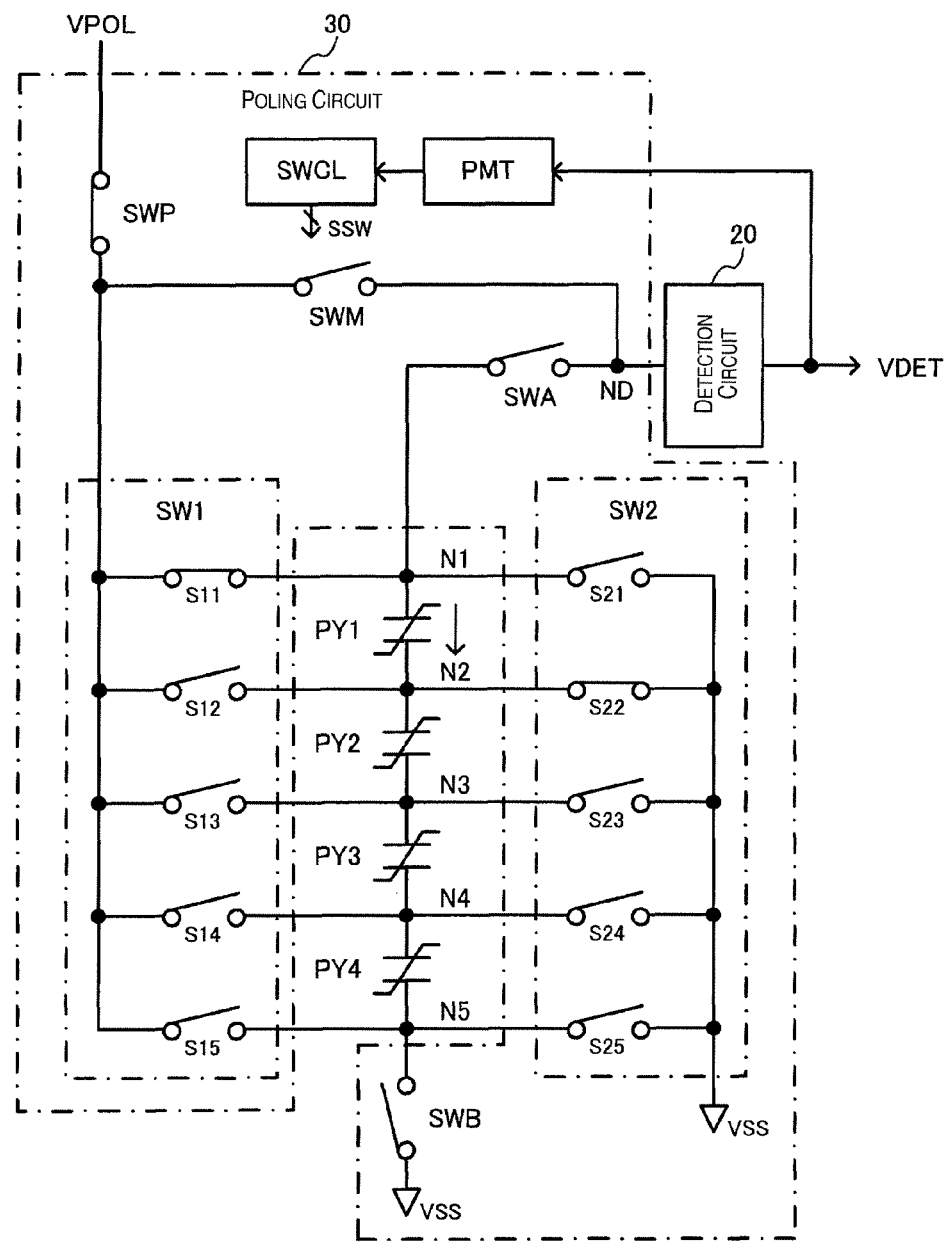
FIG. 2 is a view showing the poling processing.

FIG. 2 is a view showing the poling processing in the detection device of the present embodiment. FIG. 2 shows the poling processing for one pyroelectric element (e.g., PY1) in a detection device that includes four pyroelectric elements PY1 through PY4.

As shown in FIG. 2, the poling circuit 30 sets the detection switch element SWA, the first power supply switch element SWB, and the poling monitor switch element SWM to the OFF state and sets the poling switch element SWP to the ON state. The poling circuit 30 also sets the switch element S11 of the first switch circuit SW1 to the ON state and sets a switch element S22 of the second switch circuit SW2 to the ON state. The polarization direction of the first pyroelectric element PY1 is can thereby be set. The polarization direction of the first pyroelectric element PY1 is indicated by an arrow in FIG. 2.

Specifically, in the case that the electrode on the first connection node N1 side of the first pyroelectric element PY1 is designated as the upper electrode, and the electrode on the second connection node N2 side is designated as the lower electrode, a positive (+) polarization charge occurs by application of the first power supply voltage supplied by the first power supply node VSS on the lower electrode side, and a negative (−) polarization charge occurs by application of the poling voltage VPOL on the upper electrode side, and as a result, the polarization direction of the first pyroelectric element PY1 is set as shown in FIG. 2.

Although not shown in the drawing, the polarization direction of the second pyroelectric element PY2 can be set by setting the switch element S12 of the first switch circuit SW1 to the ON state and setting the switch element S23 of the second switch circuit SW2 to the ON state.

In other words, in the case of setting the polarization directions of the i-th (where i is an integer such that $1 \leq i \leq n$) pyroelectric element PYi among the first through n-th pyroelectric elements PY1 through PYn, the first switch circuit SW1 selects the i-th connection node Ni and applies the poling voltage VPOL, and the second switch circuit SW2 selects the (i+1)-th connection node Ni+1 and sets the (i+1)-th connection node Ni+1 to the first power supply voltage supplied by the first power supply node VSS.

Through the detection device of the present embodiment, the pyroelectric elements can be set to the polarization direction opposite from the one described above. For example, the polarization direction of the first pyroelectric element PY1 can be set to the opposite direction by setting the switch element S12 of the first switch circuit SW1 to the ON state and setting the switch element S21 of the second switch circuit SW2 to the ON state.

Specifically, a positive (+) polarization charge occurs by application of the first power supply voltage supplied by the first power supply node VSS on the upper electrode side of the first pyroelectric element PY1, and a negative (−) polarization charge occurs by application of the poling voltage VPOL on the lower electrode side, and as a result, the polarization direction of the first pyroelectric element PY1 is reversed.

In other words, in the case of setting the polarization direction of the i-th pyroelectric element PYi among the first through n-th pyroelectric elements PY1 through PYn to the opposite direction, the first switch circuit SW1 selects the (i+1)-th connection node Ni+1 and applies the poling voltage VPOL, and the second switch circuit SW2 selects the i-th connection node Ni and sets the i-th connection node Ni to the first power supply voltage supplied by the first power supply node VSS.

Figure 3:
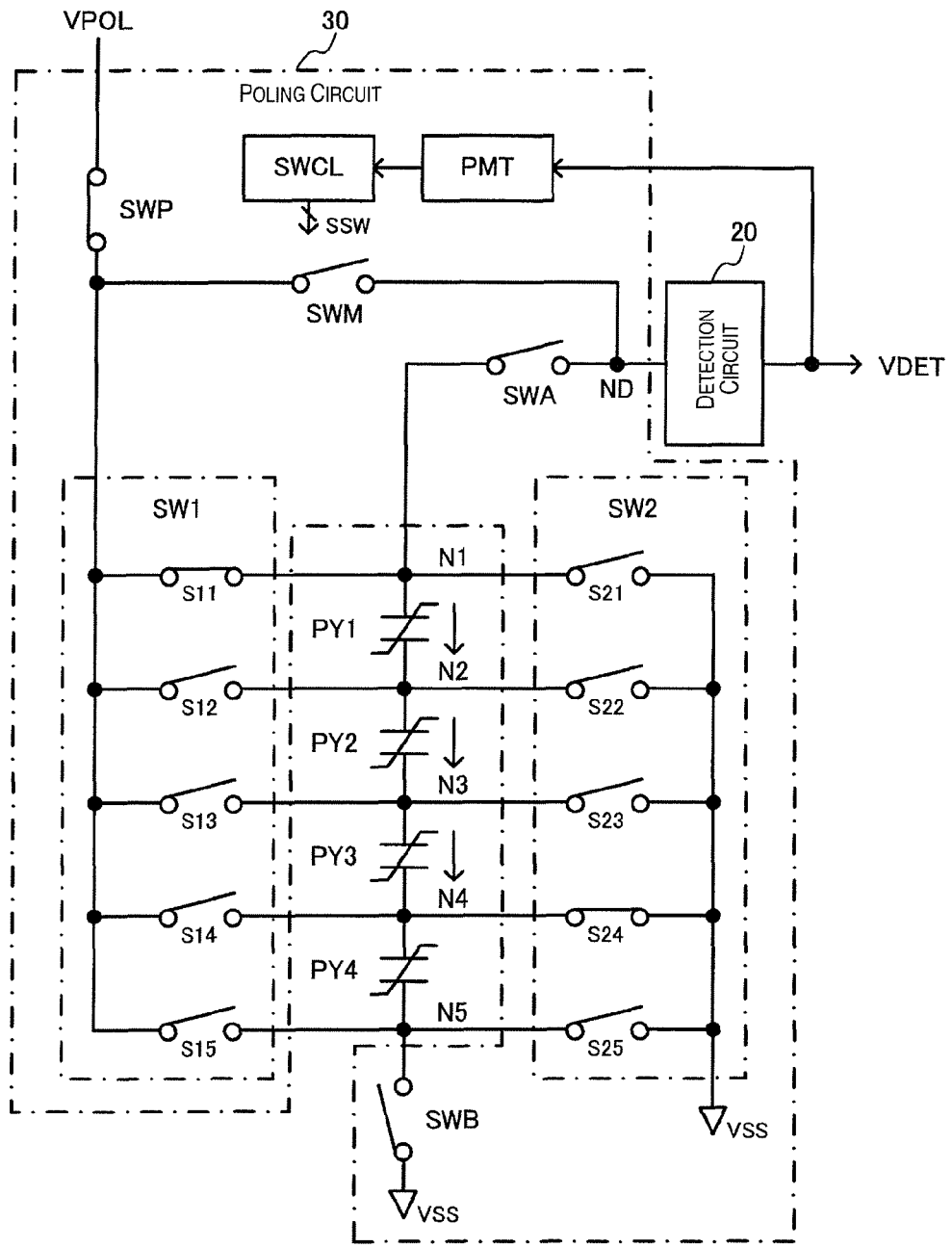
FIG. 3 is another view showing the poling processing.

FIG. 3 is another view showing the poling processing in the detection device of the present embodiment. FIG. 3 shows a case in which poling processing is performed for three pyroelectric elements (e.g., PY1 through PY3) simultaneously in a detection device that includes four pyroelectric elements PY1 through PY4.

As shown in FIG. 3, the poling circuit 30 sets the detection switch element SWA, the first power supply switch element SWB, and the poling monitor switch element SWM to the OFF state, and sets the poling switch element SWP to the ON state. The poling circuit 30 also sets the switch element S11 of the first switch circuit SW1 to the ON state and sets the switch element S24 of the second switch circuit SW2 to the ON state. The polarization directions of the first through third pyroelectric elements PY1 through PY3 can thereby be set simultaneously.

In other words, in the case of setting the polarization directions of the i-th pyroelectric element PYi through j-th pyroelectric element PYj among the first through n-th pyroelectric elements PY1 through PYn, the first switch circuit SW1 selects the i-th connection node Ni and applies the poling voltage VPOL, and the second switch circuit SW2 selects the (j+1)-th connection node Nj+1 and sets the (j+1)-th connection node Nj+1 to the first power supply voltage supplied by the first power supply node VSS.

Although not shown in the drawing, the polarization directions of the first through third pyroelectric elements PY1 through PY3 can be simultaneously set to the opposite direction described above by setting the switch element S14 of the first switch circuit SW1 to the ON state and setting the switch element S21 of the second switch circuit SW2 to the ON state.

In other words, in the case of setting the polarization directions of the p-th pyroelectric element PYp through q-th pyroelectric element PYq among the first through n-th pyroelectric elements PY1 through PYn to the opposite direction, the first switch circuit SW1 selects the (q+1)-th connection node Nq+1 and applies the poling voltage VPOL, and the second switch circuit SW2 selects the p-th connection node Np and sets the p-th connection node Np to the first power supply voltage supplied by the first power supply node VSS.

In order to simultaneously polarize n pyroelectric elements connected in series, a voltage must be applied that is equal to n times the voltage necessary to polarize a single pyroelectric element. Through the detection device of the present embodiment, since it is possible to arbitrarily set the number of pyroelectric elements to be polarized at one time, the appropriate poling processing can be performed according to the characteristics of the pyroelectric elements or the characteristics of other circuits (e.g., the withstand voltage and other characteristics).

As described above, through the detection device of the present embodiment, it is possible to individually set the polarization directions of each of first through n-th pyroelectric elements PY1 through PYn provided in series. The polarization directions of n pyroelectric elements can thereby be set to the same direction. Alternatively, the polarization directions of at least two pyroelectric elements among n pyroelectric elements can be set to the same direction, and the polarization directions of other pyroelectric elements can be set to the opposite direction.

Figure 4B:
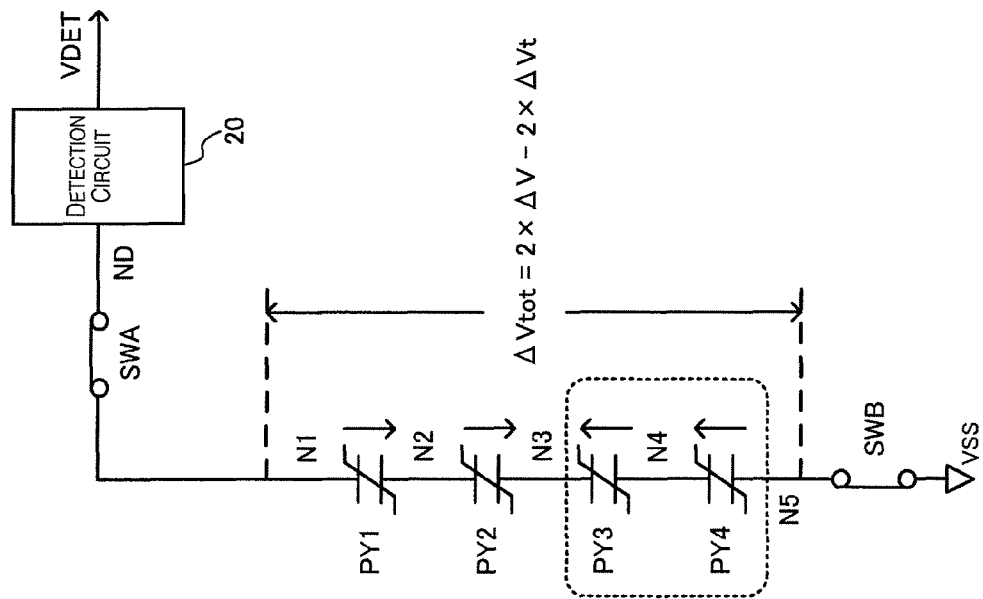
FIG. 4B is a view showing a case in which the polarization directions of the pyroelectric elements are set to different directions.
Figure 4A:
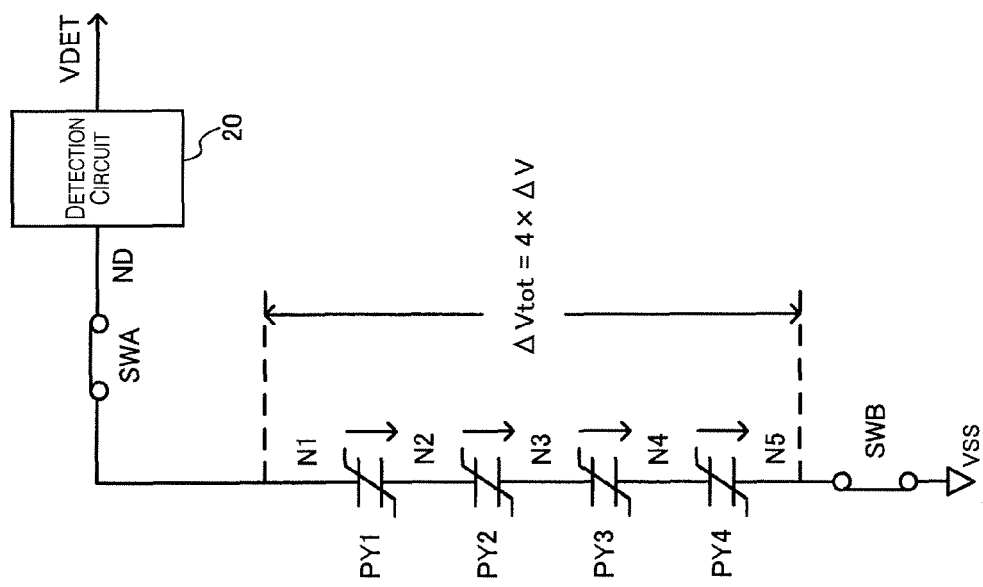
FIG. 4A is a view showing a case in which the polarization directions of the pyroelectric elements are set to the same direction.

FIG. 4A shows a case in which the polarization directions of four pyroelectric elements are set to the same direction in a detection device that includes four pyroelectric elements. In FIG. 4A, the portions relating to poling processing by the poling circuit 30 (e.g., the first and second switch circuits SW1, SW2 and other components) are not shown.

The overall electrical capacitance Ctot in a case in which the polarization directions of the first through n-th pyroelectric elements PY1 through PYn are set to the same direction is given by the following equation.

$$C tot = C/n \tag{5}$$

Here, C is the electrical capacitance of a single pyroelectric element.

Consequently, the voltage signal ΔVtot in a case in which n pyroelectric elements are connected in series is as shown below.

$$\Delta V tot = n \times (p \times \Delta T \times d / (\varepsilon \times \varepsilon 0)) \tag{6}$$

$$= n \times \Delta V$$

A voltage signal which is n times the voltage signal ΔV obtained from a single pyroelectric element can thus be obtained by connecting n pyroelectric elements having the same polarization direction in series.

Figure 5:
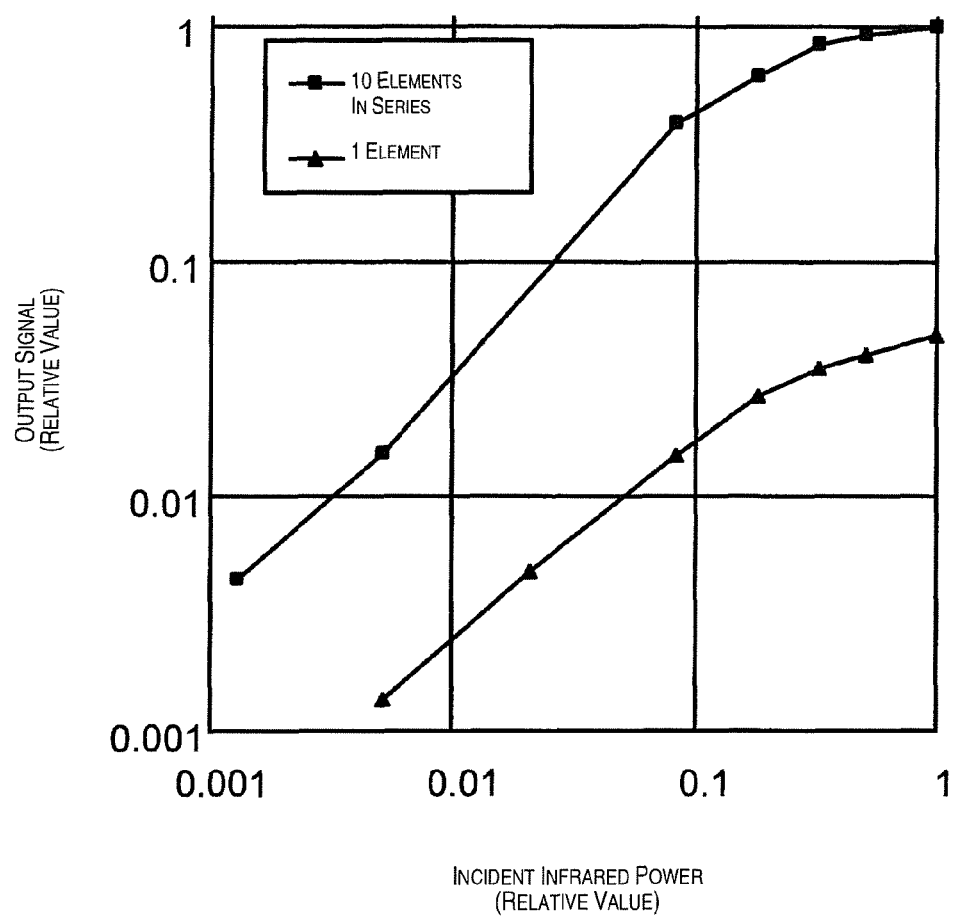
FIG. 5 is a graph showing a relationship between the power of incident infrared rays and an output signal (voltage signal)

FIG. 5 is a graph showing the relationship between the incident infrared power and the output signal (voltage signal). FIG. 5 shows a case in which ten pyroelectric elements are connected in series, and a case in which there is one pyroelectric element. As is apparent from FIG. 5, the output signal in the case of ten pyroelectric elements connected in series is approximately ten times that of one pyroelectric element.

Through the detection device of the present embodiment, by setting the polarization directions of n pyroelectric elements to the same direction, an output signal can be obtained that is n times the output signal obtained from a single pyroelectric element. As a result, the sensitivity of the detection device can be increased and the detection precision thereof enhanced without modifying the material or film thickness of the pyroelectric body (ferroelectric body).

FIG. 4B shows a case in which the polarization directions of two pyroelectric elements are set to the same direction and the polarization directions of the other two pyroelectric elements are set to the opposite direction in a detection device that includes four pyroelectric elements. In FIG. 4B, the polarization directions of the first and second pyroelectric elements PY1, PY2 are set to the first polarization direction, and the polarization directions of the third and fourth pyroelectric elements PY3, PY4 are set to the second polarization direction.

In the case that the electrode on the detection node ND side of each pyroelectric element is designated as the upper electrode, and the electrode on the first power supply node VSS side is designated as the lower electrode, the first polarization direction is the polarization direction in which a negative (−) polarization charge occurs on the upper electrode side and a positive (+) polarization charge occurs on the lower electrode side. The second polarization direction is the polarization direction in which a positive (+) polarization charge occurs on the upper electrode side and a negative (−) polarization charge occurs on the lower electrode side.

The third and fourth pyroelectric elements PY3, PY4 set to the second polarization direction are intended to compensate for disturbances or changes in the environmental temperature, and the pyroelectric elements PY3, PY4 are configured so that infrared rays are not incident thereon. Infrared detection is performed by the first and second pyroelectric elements PY1, PY2, but in a case in which there is a disturbance or a change in environmental temperature, an oppositely directed pyroelectric current occurs from the third and fourth pyroelectric elements PY3, PY4, and the effect of the disturbance or change in environmental temperature can be reduced.

As shown in FIG. 4B, in a case in which there is a disturbance or a change in environmental temperature, an oppositely directed pyroelectric current occurs from the third and fourth pyroelectric elements PY3, PY4, and as a result, a voltage signal of −2×ΔVt occurs. Here, ΔVt is the voltage signal generated from a single pyroelectric element by a disturbance or a change in environmental temperature. Consequently, the overall voltage signal ΔVtot is given by the following equation.

$$\Delta Vtot = n \times \Delta V - n \times \Delta Vt \quad (7)$$

In other words, the effect of a pyroelectric current due to a disturbance or a change in environmental temperature can be subtracted.

In FIG. 4B, the third and fourth pyroelectric elements PY3, PY4 are polarized in the opposing direction (second polarization direction), but the first and second pyroelectric elements PY1, PY2, for example, may instead be polarized in the opposing direction. Alternatively, the first and third pyroelectric elements PY1, PY3 may be polarized in the opposing direction. The number of pyroelectric elements polarized in the first polarization direction and the number of pyroelectric elements polarized in the second polarization direction are also not necessarily equal. For example, the first through third pyroelectric elements PY1 through PY3 may be polarized in the first polarization direction, and the fourth pyroelectric element PY4 may be polarized in the second polarization direction. The effect of a disturbance or the environmental temperature can be reduced to a certain degree in this case as well.

Through the detection device of the present invention thus configured, the effect of a disturbance or the environmental temperature can be reduced by setting the polarization direction of at least one pyroelectric element among the n pyroelectric elements to the direction opposite to the polarization direction of the other pyroelectric elements. As a result, infrared detection can be performed stably and with higher precision without being affected by disturbances or environmental temperature.

3. Configuration of Pyroelectric Element

Figure 6A:
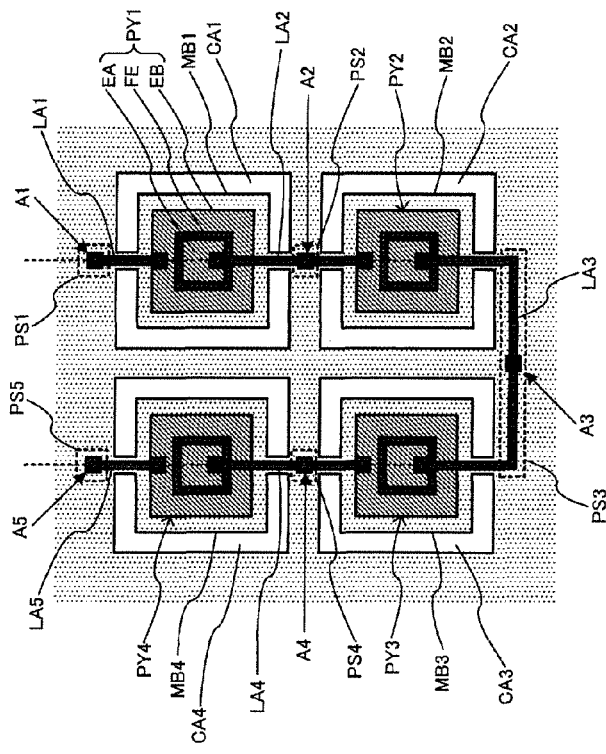
FIGS. 6A and 6B are views showing a first example of the configuration for the pyroelectric elements.
Figure 6B:
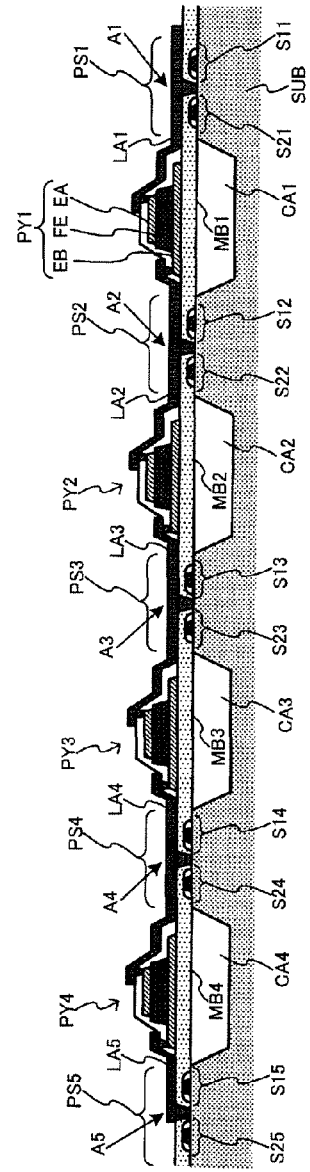

FIGS. 6A and 6B show a first configuration example for the pyroelectric elements used in the detection device of the present embodiment. FIG. 6A is a plan view showing four pyroelectric elements PY1 through PY4 connected in series from above. Here, "above" is the direction perpendicular to the substrate, and is the direction of the side on which the pyroelectric elements, transistors, and other components are formed (side on which circuits are formed), and "below" is the opposite direction from "above."

The first configuration example shown in FIGS. 6A and 6B includes first through fourth (or more broadly, n-th) pyroelectric elements PY1 through PY4, first through fourth (or more broadly, n-th) membranes (or more broadly, support members) MB1 through MB4, first through fourth (or more broadly, n-th) cavity regions (cavity parts) CA1 through CA4, wires LA1 through LA5, and a plurality of post parts (or more broadly, junctions) PS1 through PS5. In the description below, members (support members) for supporting the pyroelectric elements are referred to as membranes in the present embodiment. The junctions for connecting the membranes are referred to as post parts in the present embodiment.

The pyroelectric elements PY1 through PY4 each include an upper electrode EA, a ferroelectric body (pyroelectric body) FE, and a lower electrode EB. The ferroelectric body (pyroelectric body) FE is provided between the upper electrode EA and the lower electrode EB. The pyroelectric elements PY1 through PY4 are respectively formed on the corresponding first through fourth membranes (support members) MB1 through MB4.

The first through fourth membranes (support members) MB1 through MB4 are silicon oxide films ($SiO_2$), for example, for supporting the pyroelectric elements PY1 through PY4.

The first through fourth cavity regions CA1 through CA4 are regions provided below the corresponding first through fourth membranes MB1 through MB4, and thermally separate the pyroelectric elements PY1 through PY4 from a substrate (silicon substrate) SUB.

The post parts PS1 through PS5 connect each of the first through fourth membranes MB1 through MB4. The post parts PS1 through PS5 are provided with wires LA1 through LA5, respectively. The poling circuit 30 feeds the poling voltage VPOL to the first through fourth pyroelectric elements PY1 through PY4 via the wires LA1 through LA5.

Specifically, the wire LA1 is provided to the post part PS1, for example, and the wire LA1 electrically connects the pyroelectric element PY1 and the poling circuit 30 (first and second switch circuits SW1, SW2 and other components). The wire LA2 is provided to the post part PS2, and the wire LA2 electrically connects the pyroelectric element PY1 and the pyroelectric element PY2, and is also electrically connected to the poling circuit 30.

FIG. 6B shows a cross section along the path from A1 to A5 in FIG. 6A. As shown in FIG. 6B, the wires LA1 through LA5 are connected to the switch elements of the first and second switch circuits SW1, SW2. For example, the wire LA1 is connected to the switch element S11 of the first switch circuit SW1 and the switch element S21 of the second switch circuit SW2 (A1 in FIG. 6B). The wire LA2 is connected to the switch element S12 of the first switch circuit SW1 and the switch element S22 of the second switch circuit SW2 (A2 in FIG. 6B). In the same manner, the wires LA3 through LA5 are connected to the corresponding switch elements of the first and second switch circuits SW1, SW2 (A3 through A5 in FIG. 6B). These switch elements may be composed of MOS transistors or the like formed on a silicon substrate, for example.

Although not shown in the drawings, the wire LA1 is furthermore connected to the detection switch element SWA, and the wire LA5 is furthermore connected to the first power supply switch element SWB.

FIG. 7A shows a second configuration example for the pyroelectric elements used in the detection device of the present embodiment. The second configuration example includes first through fourth (or more broadly, n-th) pyroelectric elements PY1 through PY4, first through fourth (or more broadly, n-th) membranes (or more broadly, support members) MB1 through MB4, a shared cavity region CA, wires LA1 through LA5, and post parts PS1 through PS5.

The first through fourth pyroelectric elements PY1 through PY4 are respectively formed on the corresponding first through fourth membranes MB1 through MB4. The shared cavity region CA is provided below the first through fourth membranes MB1 through MB4.

In the second configuration example as well, the wires LA1 through LA5 are provided to the post parts PS1 through PS5, respectively, and the wires LA1 through LA5 are connected to the switch elements of the first and second switch circuits SW1, SW2, the same as in the first configuration example. The wire LA1 is furthermore connected to the detection switch element SWA, and the wire LA5 is furthermore connected to the first power supply switch element SWB.

FIG. 7B shows a third configuration example for the pyroelectric elements used in the detection device of the present embodiment. The third configuration example includes first through fourth (or more broadly, n-th) pyroelectric elements PY1 through PY4, a shared membrane (or more broadly, a shared support member) MB, a shared cavity region CA, wires LA1 through LA5, and post parts PS1 through PS5.

The first through fourth pyroelectric elements PY1 through PY4 are formed on the shared membrane MB. The shared cavity region CA is provided below the shared membrane MB.

In the third configuration example as well, the wires LA1 through LA5 are provided to the post parts PS1 through PS5, respectively, and the wires LA1 through LA5 are connected to the switch elements of the first and second switch circuits SW1, SW2, the same as in the first and second configuration examples. The wire LA1 is furthermore connected to the detection switch element SWA, and the wire LA5 is furthermore connected to the first power supply switch element SWB.

In the first and second configuration examples, since the surface area of the membrane can be smaller than in the third configuration example, the heat capacity can be reduced. As a result, the sensitivity of the detection device can be further increased, the detection precision can be further enhanced, and other effects can be obtained.

In the third configuration example, however, since a plurality of pyroelectric elements can be provided on a single membrane, the surface area of a single sensor (sensor cell) can be reduced. As a result, sensor cells can be arranged at high density in a sensor array in which a plurality of sensor cells is arranged in an array.

4. Detection Circuit

Figure 8A:
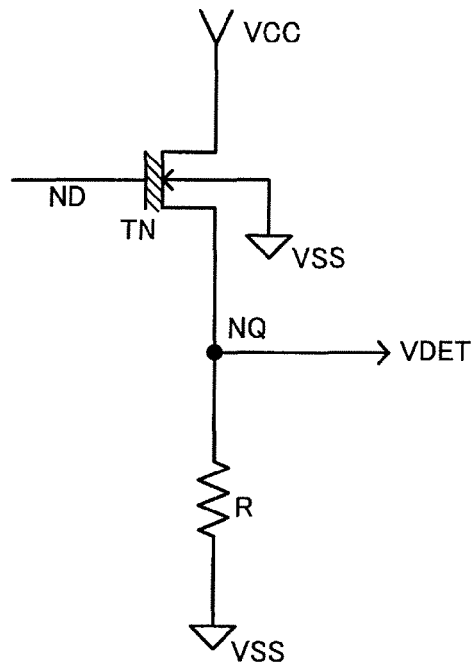
FIGS. 8A and 8B are views showing first and second examples, respectively, of the configuration for the detection circuit.
Figure 8B:
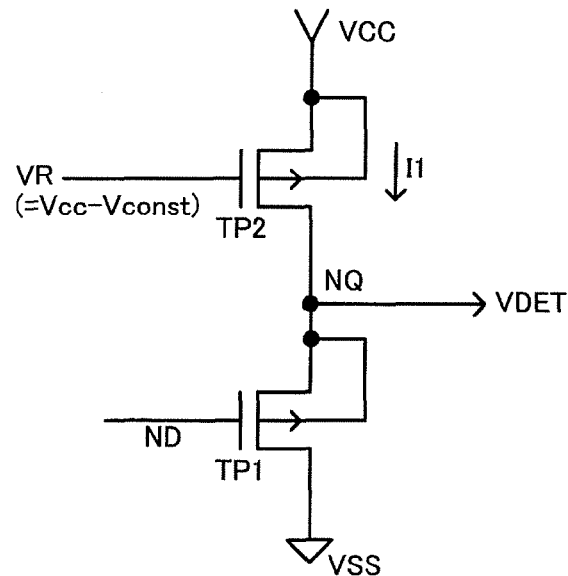

FIGS. 8A and 8B show first and second configuration examples for the detection circuit 20 used in the detection device of the present embodiment. The detection circuit 20 of the present embodiment is not limited to the configuration shown in FIGS. 8A and 8B, and it will be apparent to those skilled in the art that various modifications thereof are possible, such as omitting some elements, replacing some elements with other elements, or adding other elements.

The first configuration example shown in FIG. 8A includes an N-type depletion transistor TN and a resistor R. The N-type depletion transistor TN and the resistor R are provided in series between a second power supply node VCC (high-potential-side power supply node) and a first power supply node VSS (low-potential-side power supply node), and constitute a source follower circuit.

The voltage signal $\Delta V$ from a pyroelectric element is inputted to the gate (detection node ND) of the N-type transistor TN, and the source of the N-type transistor TN is connected to one end of the resistor R. The transistor TN and the resistor R constitute a source follower circuit, and the gain thereof is substantially 1. A detection signal VDET (output voltage) that varies with the voltage signal $\Delta V$ is outputted from an output node NQ which corresponds to the source of the N-type transistor TN.

The detection circuit of the first configuration example has the drawback of being easily affected by manufacturing variation. Manufacturing variation includes, for example, variation of the current feed capability of the transistor TN, threshold value variation, shape variation, variation of the sheet resistance of the resistor R, variation of the shape of the resistor R, and other variation. Variation of the characteristics of a resistor manufactured on an IC substrate is generally greater than the variation of the characteristics of a transistor. Fluctuation of resistor characteristics that depends on fluctuation in manufacturing conditions, and fluctuation of transistor characteristics are also not associated with each other. The detection signal VDET of the detection circuit of the first configuration example therefore varies significantly.

The detection circuit of the second configuration example shown in FIG. 8B includes a first P-type transistor TP1 and second P-type transistor TP2 provided in series between the second power supply node VCC and the first power supply node VSS. The first and second P-type transistors TP1, TP2 constitute a source follower circuit. In other words, a voltage having an amplitude at which the gain is substantially 1 is outputted as the detection signal VDET (output voltage) with respect to a small signal amplitude variation of the voltage signal $\Delta V$ from the pyroelectric element.

The first P-type transistor TP1 (P-type MOS transistor) is provided between the output node NQ and the first power supply node VSS (low-potential-side power supply node) of the detection circuit. In FIG. 8B, for example, the source of the TP1 is connected to the output node NQ, the drain is connected to the first power supply node VSS, and the voltage signal $\Delta V$ from the pyroelectric element is inputted to the gate.

The second P-type transistor TP2 (P-type MOS transistor) is provided between the second power supply node VCC (high-potential-side power supply node) and the output node NQ. In FIG. 8B, for example, the source of the TP2 is connected to the second power supply node VCC, the drain is connected to the output node NQ, and the gate is set to a reference voltage VR=Vcc−Vconst. Here, Vcc is the voltage of the high-potential-side power supply VCC, and Vconst is a constant voltage (fixed voltage).

The substrate potential of the first P-type transistor TP1 is set to the potential of the source of the TP1. In FIG. 8B, for example, the substrate potential of the TP1 is connected to the output node NQ. The substrate potential of the second P-type transistor TP2 is set to the potential of the source of the TP2. In FIG. 8B, for example, the substrate potential of the TP2 is connected to the second power supply node VCC. By thus setting the substrate potentials of the P-type transistors TP2, TP2 to the source potential, fluctuation of the threshold voltage of the TP1, TP2 due to substrate bias effects can be prevented, and the threshold voltage of the TP1 and TP2 can therefore be closer together. A modified configuration is also possible in which the substrate potentials of the P-type transistors TP1, TP2 are both set to the VCC potential.

At least one of the gate length and the gate width of the P-type transistors TP1 and TP2 is the same. More preferably, both the gate length and the gate width of the TP1 and TP2 are the same. Through this configuration, the threshold voltage and other element characteristics of the P-type transistors TP1, TP2 can be brought closer together, and fluctuation of the detection signal VDET (output voltage) caused by manufacturing process fluctuation and other factors can be suppressed.

The operation of the detection circuit according to a second configuration example will next be described in further detail. As shown in FIG. 8B, the gate of the transistor TP2 is set to the reference voltage VR=Vcc−Vconst. Consequently, the gate-source voltage of the transistor TP2 is Vconst, and the TP2 operates in a saturation region, and a current I1 determined almost solely by the gate-source voltage Vconst and the threshold voltage flows to the TP2.

On the other hand, since the transistor TP1 is connected in series to the transistor TP2, the same current I1 flows to the TP1. The substrate potential of the transistor TP1 is set to the source potential, the same as in the transistor TP2. Consequently, the threshold voltage of the transistor TP1 and the threshold voltage of the transistor TP2 can be equal. Furthermore, when the transistor TP1 operates in the saturation region, and the transistors TP1 and TP2 are assumed to have the same transistor size (same gate width and gate length), the gate-source voltage of the TP1 is substantially the same as the gate-source voltage Vconst of the TP2. Since the gate of the transistor TP1 is connected to the pyroelectric element, and the resistor of the pyroelectric element is present between the VSS and the detection node ND of the gate of the TP1, the detection node ND is constantly set to 0 V (the VSS level). Consequently, the detection signal VDET of the output node NQ of the detection circuit, which is the source node of the transistor TP1, is constantly set to substantially the same voltage as Vconst.

When infrared rays are radiated to the pyroelectric element in this state and the temperature of the pyroelectric element changes, the resultant pyroelectric current transiently charges the gate (gate capacitance) of the transistor TP1, and the voltage fluctuates by ΔV. At this time, since the current I1 from the transistor TP2 flows to the transistor TP1, VDET, which is the source voltage of the TP1, is given by VDET=Vconst+ΔV. In other words, the circuit composed of the transistors TP1, TP2 operates as a source follower circuit in which the gain=1.

In the detection circuit according to the second configuration example configured as described above, in the case that Vcc is fed as the high-potential-side power supply voltage, the gate of the P-type transistor TP2 is set to the reference voltage VR=Vcc−Vconst. A voltage that changes with the voltage signal ΔV from the pyroelectric element is then outputted to the source of the P-type transistor TP1 on the basis of the set voltage corresponding to Vconst. For example, when the temperature of the pyroelectric element changes and the voltage from the pyroelectric element changes by ΔV from 0 V, the output voltage VDET also changes by ΔV on the basis of the set voltage corresponding to Vconst. Here, the set voltage corresponding to Vconst may be Vconst as such or a voltage slightly different from Vconst.

The voltage Vconst is preferably set so that Vth≦Vconst≦Vcc−Vth, where Vth is the threshold voltage of the P-type transistor TP2 (TP1). In other words, a reference voltage VR Vcc−Vconst which establishes such a relationship is inputted to the gate of the P-type transistor TP2. The transistors TP1, TP2 can thereby be made to operate in the saturation region. Since Vconst, which is the set voltage of the output voltage VDET, also becomes equal to or greater than the threshold voltage Vth, a voltage equal to or greater than the threshold voltage Vth can be constantly inputted to an amplification circuit or A/D converter of a subsequent stage. Consequently, the amplification circuit or A/D converter of a subsequent stage can be more easily designed, and compact and simple circuits can be used for the amplification circuit or A/D converter.

5. Sensor Device

Figure 9A:
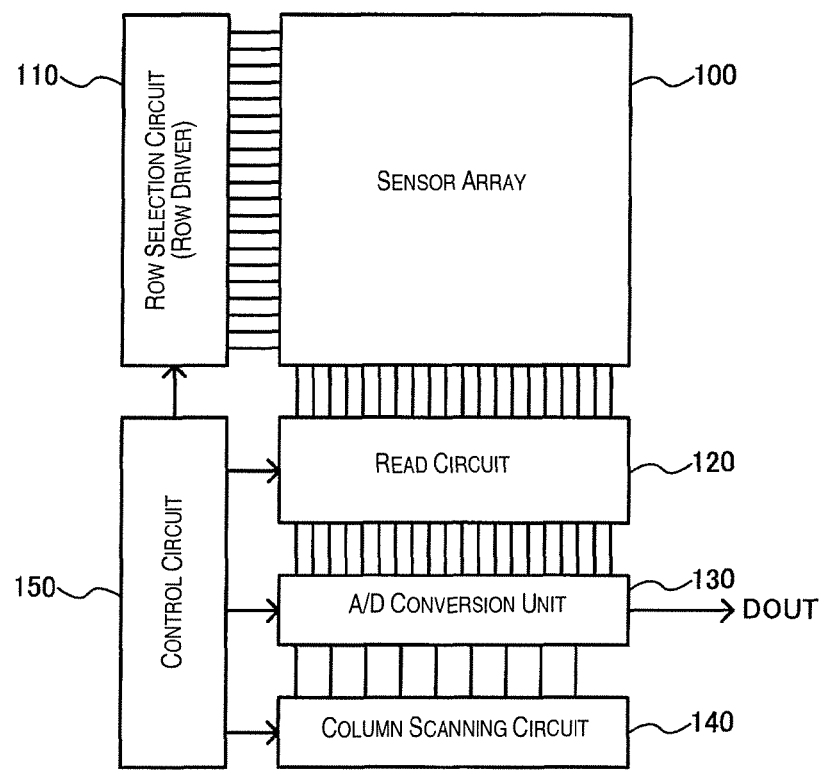
FIGS. 9A and 9B are examples of the configuration of a sensor device.

FIG. 9A shows an example of the configuration of the sensor device of the present embodiment. This sensor device includes a sensor array 100, a row selection circuit (row driver) 110, and a read circuit 120. An A/D conversion unit 130, a column scanning circuit 140, and a control circuit 150 may also be included. An infrared camera or the like used in a night vision instrument or the like, for example, can be realized through the use of the sensor device described above.

A plurality of sensor cells is arrayed (arranged) in the sensor array 100 (focal plane array). A plurality of row lines (word lines, scan lines) and a plurality of column lines (data lines) are also provided. The number of either the row lines or the column lines may be one. In a case in which there is one row line, for example, a plurality of sensor cells is arrayed in the direction (transverse direction) of the row line in FIG. 9A. In a case in which there is one column line, a plurality of sensor cells is arrayed in the direction (longitudinal direction) of the column line.

Figure 9B:
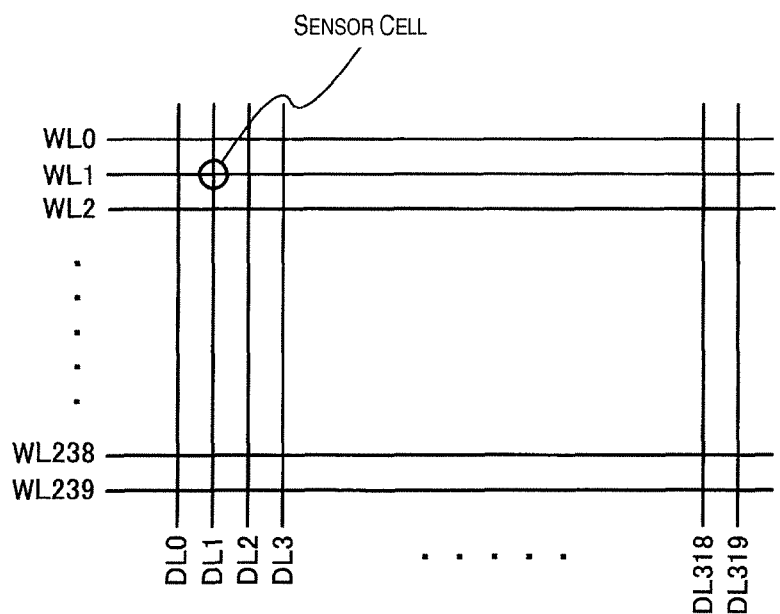

As shown in FIG. 9B, the sensor cells of the sensor array 100 are arranged (formed) in locations corresponding to the intersection positions of the row lines and the column lines. For example, a sensor cell in FIG. 9B is disposed at a location corresponding to the intersection position of word line WL1 and column line DL1. Other sensor cells are arranged in the same manner.

The row selection circuit 110 is connected to one or more row lines, and selects each row line. Using a QVGA (320×240 pixels) sensor array 100 (focal plane array) such as the one shown in FIG. 9B as an example, an operation is performed for sequentially selecting (scanning) the word lines WL0, WL1, WL2, . . . WL239. In other words, signals (word selection signals) for selecting these word lines are outputted to the sensor array 100.

The read circuit 120 is connected to one or more column lines, and reads each column line. Using the QVGA sensor array 100 as an example, an operation is performed for reading detection signals (detection currents, detection charges) from the column lines DL0, DL1, DL2, ... DL319.

The A/D conversion unit 130 performs processing for A/D conversion of detection voltages (measurement voltages, attained voltages) acquired in the read circuit 120 into digital data. The A/D conversion unit 130 then outputs the A/D converted digital data DOUT. Specifically, the A/D conversion unit 130 is provided with A/D converters corresponding to each of the plurality of column lines. Each A/D converter performs A/D conversion processing of the detection voltage acquired by the read circuit 120 in the corresponding column line. A configuration may be adopted in which a single A/D converter is provided so as to correspond to a plurality of column lines, and the single A/D converter is used in time division for A/D conversion of the detection voltages of a plurality of column lines.

The column scanning circuit 140 performs an operation for sequentially selecting (scanning) the columns and outputting the A/D converted digital data of each column as time-series data. A configuration may also be adopted in which a column scanning circuit 140 is not provided, and digital data of each column are outputted in parallel.

The control circuit 150 (timing generation circuit) generates various control signals and outputs the control signals to the row selection circuit 110, the read circuit 120, the A/D conversion unit 130, and the column scanning circuit 140. A control signal for charging or discharging (reset), for example, is generated and outputted. Alternatively, a signal for controlling the timing of each circuit is generated and outputted.

Figure 10:
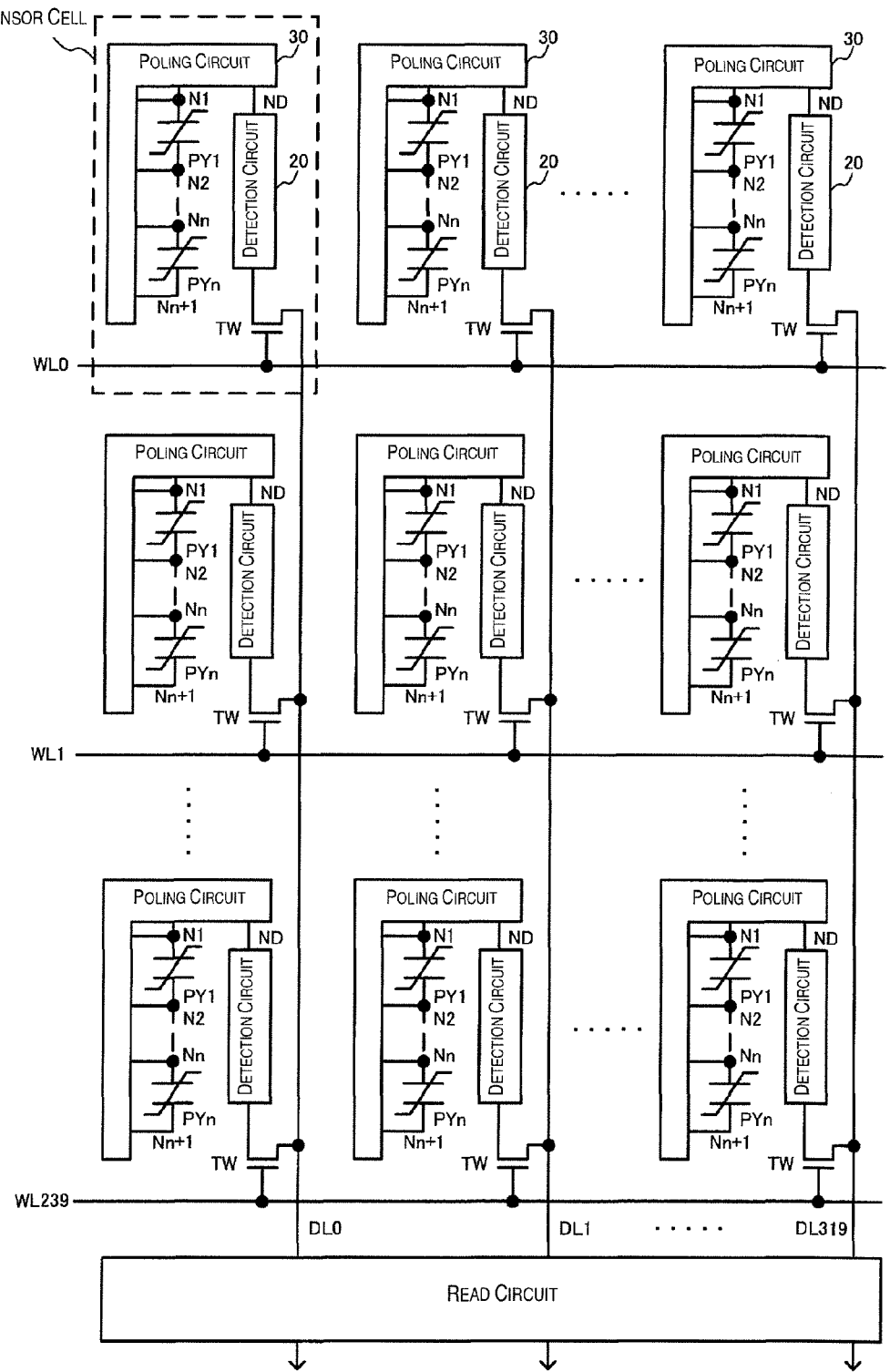
FIG. 10 is a detailed example of the configuration of a sensor array.

FIG. 10 shows an example of the detailed configuration of the sensor array 100.

Each sensor cell includes first through n-th (where n is an integer equal to 2 or greater) pyroelectric elements PY1 through PYn provided in series between a detection node ND and a first power supply node VSS; a detection circuit 20 connected to the detection node ND; and a poling circuit 30 for performing poling processing for setting the polarization directions of the first through n-th pyroelectric elements PY1 through PYn to the same direction. The polarization directions of the first through n-th pyroelectric elements PY1 through PYn are set to the same direction.

The detection signals from each of the sensor cells are read as described below. For example, in a case in which the word line WL0 is selected, a transistor TW whose gate is connected to the word line WL0 changes to the ON state. One or a plurality of sensor cells that correspond to the word line WL0 are then electrically connected to the corresponding column lines DL (DL0 through DL319). At this time, the word lines WL (WL1 through WL239) other than the word line WL0 are not selected.

The detection signals from the one or a plurality of sensor cells that corresponds to the word line WL0 are thus read for each column. The other word lines WL (WL1 through WL239) are then sequentially selected, and detection signals from the sensor cells are read in the same manner as described above.

Figure 11:
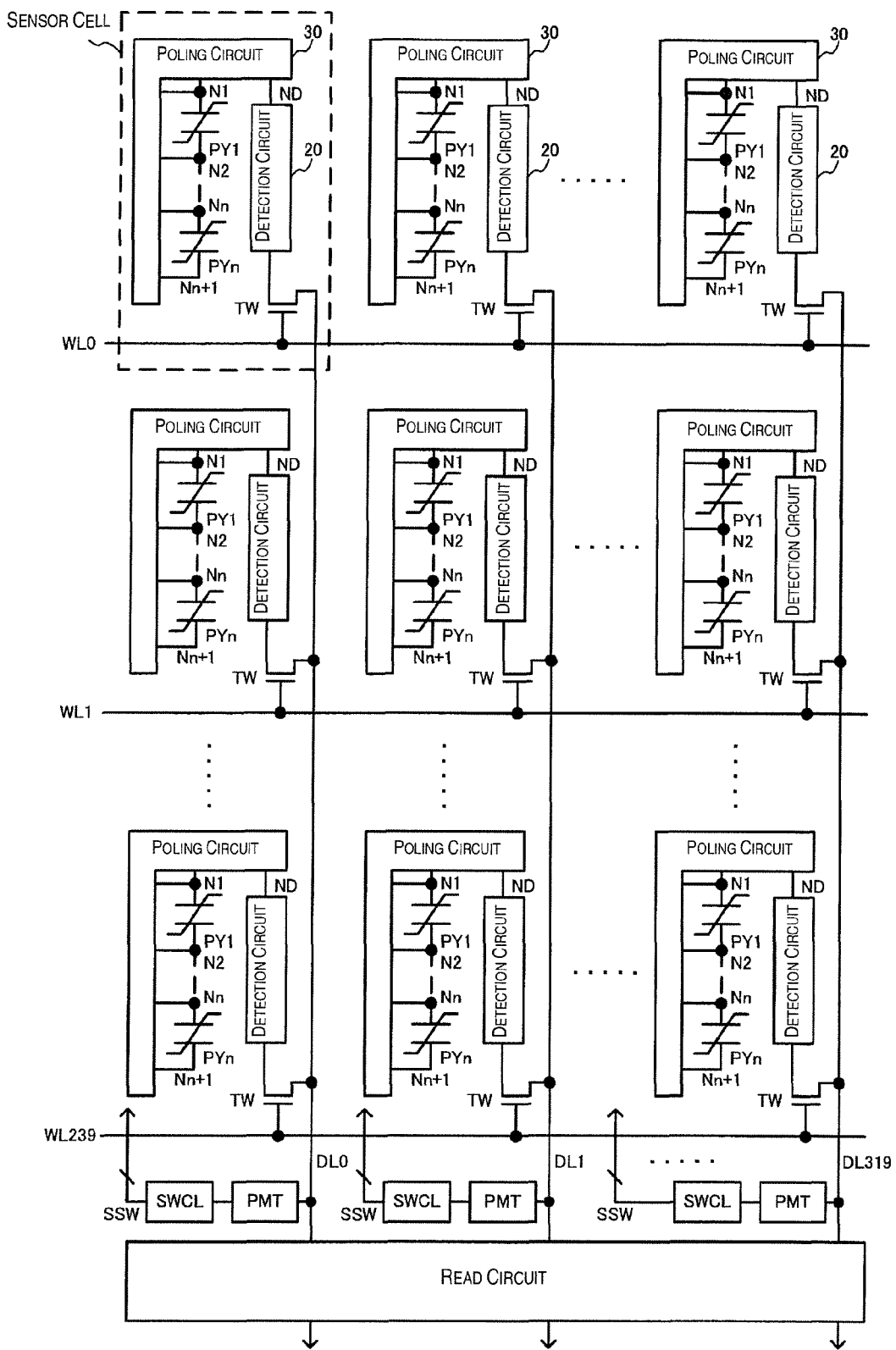
FIG. 11 is a modified example of the configuration of a sensor array.

FIG. 11 shows a modification of the sensor array 100. In the modification shown in FIG. 11, the poling monitor circuit PMT and the switch control circuit SWCL are provided for each column rather than for each sensor cell. Through this configuration, since the surface area of the sensor cells can be reduced, the sensor cells can be arranged at a higher density.

Through the sensor device of the present embodiment, the polarization directions of n pyroelectric elements provided in series can be individually set. For example, by setting the polarization directions of n pyroelectric elements to the same direction, a detection signal can be obtained that is n times the voltage level of the detection signal obtained from a single pyroelectric element. As a result, since the detection sensitivity of the sensor device can be increased without modifying the material or film thickness of the pyroelectric body (ferroelectric body), a highly sensitive infrared camera, for example, or the like can be realized. By setting the polarization direction of at least one pyroelectric element among n pyroelectric elements, for example, to the direction opposite the polarization direction of the other pyroelectric elements, the effect of a disturbance or change in environmental temperature can be reduced. As a result, a stable and more highly precise infrared camera or the like can be realized that is not affected by disturbances or environmental temperature.

6. Electronic Apparatus

Figure 12:
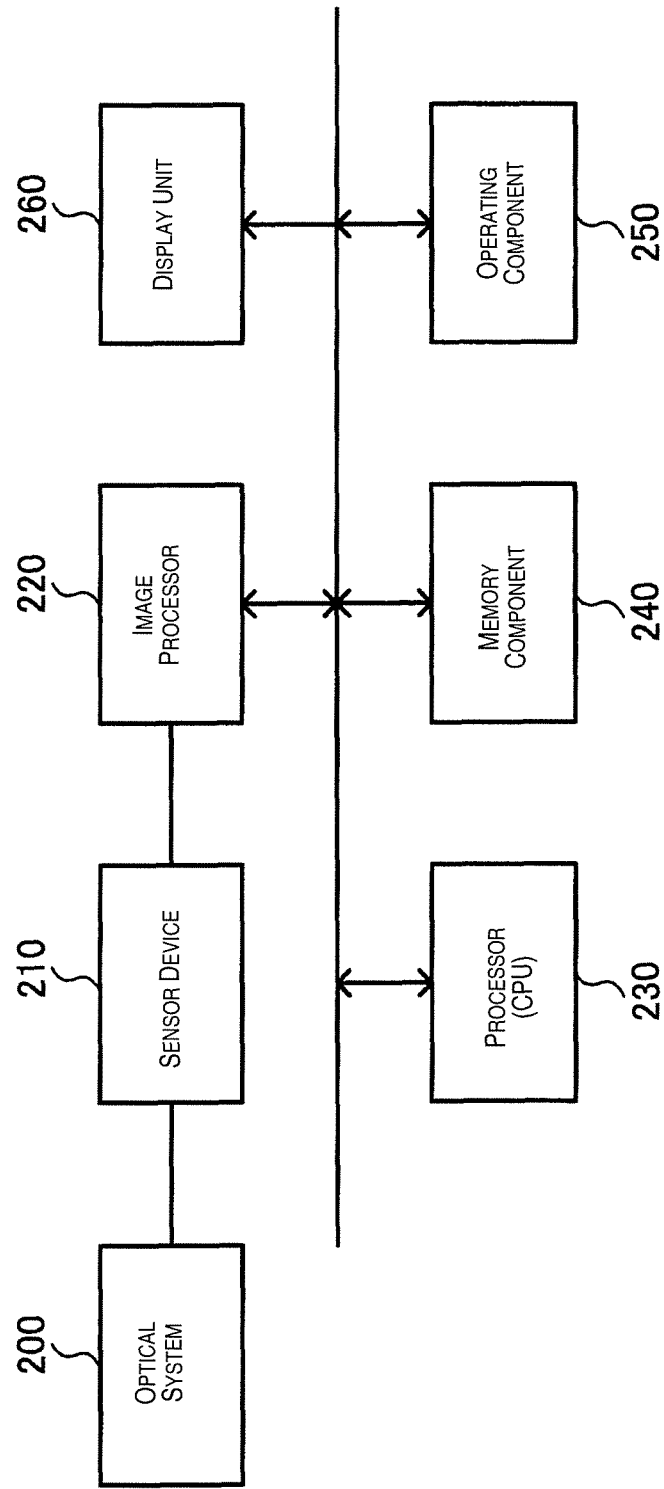
FIG. 12 is an example of the configuration of an electronic apparatus comprising a sensor device.

FIG. 12 shows an example of the configuration of an electronic apparatus which includes the sensor device of the present embodiment. The electronic apparatus is an infrared camera, for example, and includes an optical system 200, a sensor device 210, an image processor 220, a processor 230, a memory component 240, an operating component 250, and a display unit 260. The electronic apparatus of the present embodiment is not limited to the configuration shown in FIG. 12, and it will be apparent to those skilled in the art that various modifications thereof are possible, such as omitting some elements (e.g., the optical system, operating unit, display unit, or other components) or adding other elements.

The optical system 200 includes one or a plurality of lenses, for example, a drive unit for driving the lenses, and other components. Such operations as forming an image of an object on the sensor device 210 are also performed. Focusing and other adjustments are also performed as needed.

The sensor device 210 is the device described using FIG. 9A and other drawings, and performs image capture processing of an object image. The image processor 220 performs image correction processing and various other types of image processing on the basis of digital image data (pixel data) from the sensor device 210.

The processor 230 controls the electronic apparatus as a whole and controls each block within the electronic apparatus. The processor 230 is realized by a CPU or the like, for example. The memory component 240 stores various types of information and functions as a work area for the processor 230 or the image processor 220, for example. The operating component 250 serves as an interface for operation of the electronic apparatus by a user, and is realized by various buttons, a GUI (graphical user interface) screen, or the like, for example. The display unit 260 displays the image acquired by the sensor device 210, the GUI screen, and other images, for example, and is realized by a liquid crystal display, an organic EL display, or another type of display or projection-type display apparatus or the like.

The present embodiment can be applied to an infrared camera which uses an FPA (Focal Plane Array) or to an electronic apparatus which uses an infrared camera. Possible examples of electronic apparatuses in which an infrared camera is applied include night vision instruments for capturing an image of an object at night, thermography instruments for acquiring a temperature distribution of an object, intrusion detection instruments for detecting intrusion by a person, analysis instruments (measurement instruments) for analyzing (measuring) physical information of an object, security instruments for detecting fire or heat, and FA (Factory Automation) instruments provided in a factory or the like. By applying a night vision instrument as an automobile instrument, the outline of a person or other object at night can be detected and displayed during vehicle travel. Application in a thermography instrument enables use in influenza quarantine and the like.

The present embodiment is described in detail above, but it will be readily apparent to those skilled in the art that numerous modifications can be made herein without substantively departing from the new matter and effects of the present invention. All such modifications are thus included in the scope of the present invention. For example, in the specification or drawings, terms (membrane, post part, and other terms) which appear at least once together with different terms (support member, junction, and other terms) that are broader or equivalent in meaning may be replaced with the different terms in any part of the specification or drawings. The configuration and operation of the detection device, sensor device, and electronic apparatus are also not limited to the description thereof in the present embodiment, and various modifications thereof are possible.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A detection device comprising:
a plurality of pyroelectric elements including a first pyroelectric element through an n-th pyroelectric element serially provided between a detection node and a first power supply node with n being an integer equal to or greater than 2;
a detection circuit connected to the detection node; and
a poling circuit configured to perform a poling process, in which a direction of polarization of at least one of the first pyroelectric element through the n-th pyroelectric element is set independently of a direction of polarization of another one of the first pyroelectric element through the n-th pyroelectric element.

2. The detection device according to claim 1, wherein the poling circuit is configured to set the directions of polarization of at least two of the first pyroelectric element through the n-th pyroelectric element to a first polarization direction, and to set the directions of polarization of the pyroelectric elements other than the at least two of the first pyroelectric element through the n-th pyroelectric element to a second polarization direction which is the opposite direction from the first polarization direction.

3. The detection device according to claim 1, wherein when the directions of polarization of an i-th pyroelectric element through a j-th pyroelectric element among the first pyroelectric element through the n-th pyroelectric element are set to a first polarization direction, the poling circuit is configured to apply a poling voltage to an i-th connection node disposed at one end of the i-th pyroelectric element, and to set a (j+1)-th connection node disposed at the other end of the j-th pyroelectric element to a first power supply voltage.

4. The detection device according to claim 3, wherein the poling circuit includes
a first switch circuit configured to apply the poling voltage to the i-th connection node, and
a second switch circuit configured to set the (j+1)-th connection node to the first power supply voltage.

5. The detection device according to claim 3, wherein when the directions of polarization of a p-th pyroelectric element through a q-th pyroelectric element among the first pyroelectric element through the n-th pyroelectric element are set to a second polarization direction which is the opposite direction from the first polarization direction, the poling circuit is configured to set a p-th connection node disposed at one end of the p-th pyroelectric element to the first power supply voltage, and to apply the poling voltage to a (q+1)-th connection node disposed at the other end of the q-th pyroelectric element.

6. The detection device according to claim 5, wherein the poling circuit includes
a first switch circuit configured to apply the poling voltage to the (q+1)-th connection node, and
a second switch circuit configured to set the p-th connection node to the first power supply voltage.

7. The detection device according to claim 1, wherein the poling circuit includes a detection switch element disposed between the detection node and a first connection node disposed at one end of the first pyroelectric element, and
the poling circuit is configured to set the detection switch element to an ON state during a detection period, and to set the detection switch element to an OFF state during a period of the poling processing.

8. The detection device according to claim 1, wherein the poling circuit includes a poling monitor circuit configured to monitor whether or not the poling process has been performed in a normal manner.

9. The detection device according to claim 8, wherein the poling monitor circuit is configured to connect a connection node disposed at one end of each of the first pyroelectric element through the n-th pyroelectric element to the detection node, and to monitor the direction of polarization of each of the first pyroelectric element through the n-th pyroelectric element based on a detection result of the detection circuit.

10. The detection device according to claim 1, further comprising
a shared support member supporting the first pyroelectric element through the n-th pyroelectric element, with the first pyroelectric element through the n-th pyroelectric element being formed on the shared support member.

11. The detection device according to claim 10, further comprising
a shared cavity region provided below the shared support member.

12. A sensor device comprising:
a sensor array having a plurality of sensor cells with each of the sensor cells including
a plurality of pyroelectric elements including a first pyroelectric element through an n-th pyroelectric element serially provided between a detection node and a first power supply node with n being an integer equal to or greater than 2,
a detection circuit connected to the detection node, and
a poling circuit configured to perform a poling process, in which a direction of polarization of at least one of the first pyroelectric element through the n-th pyroelectric element is set independently of a direction of polarization of another one of the first pyroelectric element through the n-th pyroelectric element;
one or more row lines;
one or more column lines;
a row selection circuit connected to the one more row lines; and
a read circuit connected to the one more column lines.

13. An electronic apparatus comprising the sensor device according to claim 12.

14. A detection device comprising:
a plurality of pyroelectric elements electrically connected in series between a detection node and a power supply node;
a detection circuit configured to detect a current in the pyroelectric elements, the detection circuit being connected to the detection node; and
a poling circuit configured to perform a poling process, in which a direction of polarization of each of the pyroelectric elements is set individually.

15. The detection device according to claim 14, wherein the poling circuit is configured to set the direction of polarization of at least two of the pyroelectric elements to a first polarization direction, and to set the direction of polarization of the pyroelectric elements other than the at least two of the pyroelectric elements to a second polarization direction which is the opposite direction from the first polarization direction.

16. The detection device according to claim 15, wherein when the direction of polarization of the at least two of the pyroelectric elements is set to the first polarization direction, the poling circuit is configured to apply a poling voltage to a connection node disposed at one end of a first end one of the at least two of the pyroelectric elements, and to set a connection node disposed at the other end of a second end one of the at least two of the pyroelectric elements to a first power supply voltage.

17. The detection device according to claim 16, wherein the poling circuit includes
a first switch circuit configured to apply the poling voltage to the connection node disposed at the one end of the first end one of the at least two of the pyroelectric elements, and
a second switch circuit configured to set the connection node disposed at the other end of the second end one of the at least two of the pyroelectric elements to the first power supply voltage.

18. The detection device according to claim 14, wherein the poling circuit includes a detection switch element disposed between the detection node and a connection node disposed at one end of an end one of the pyroelectric elements, and
the poling circuit is configured to set the detection switch element to an ON state during a detection period, and to set the detection switch element to an OFF state during a period of the poling processing.

19. The detection device according to claim 14, wherein the poling circuit includes a poling monitor circuit configured to monitor whether or not the poling process has been performed in a normal manner.

20. A sensor device including the detection device according to claim 14.

* * * * *